(12) United States Patent
Brindley

(10) Patent No.: US 7,853,558 B2
(45) Date of Patent: Dec. 14, 2010

(54) INTELLIGENT AUGMENTATION OF MEDIA CONTENT

(75) Inventor: Richard Brindley, Buckinghamshire (GB)

(73) Assignee: Vibrant Media, Inc., New York, NY (US)

(*) Notice: Subject to any disclaimer, the term of this patent is extended or adjusted under 35 U.S.C. 154(b) by 369 days.

(21) Appl. No.: 12/033,539

(22) Filed: Feb. 19, 2008

(65) Prior Publication Data

US 2009/0125544 A1 May 14, 2009

Related U.S. Application Data

(60) Provisional application No. 60/986,965, filed on Nov. 9, 2007.

(51) Int. Cl.
G06F 17/00 (2006.01)

(52) U.S. Cl. .................. 707/608; 707/609; 707/791; 707/802; 707/821

(58) Field of Classification Search .......... 707/600–831
See application file for complete search history.

(56) References Cited

U.S. PATENT DOCUMENTS

| | | | |
|---|---|---|---|
| 5,204,947 A | 4/1993 | Bernstein et al. |
| 5,251,294 A | 10/1993 | Abelow |
| 5,603,025 A | 2/1997 | Tabb et al. |
| 5,694,594 A | 12/1997 | Chang |
| 5,708,825 A | 1/1998 | Sotomayor |
| 5,751,961 A | 5/1998 | Smyk |
| 5,764,906 A | 6/1998 | Edelstein et al. |
| 5,794,257 A | 8/1998 | Liu et al. |
| 5,815,830 A | 9/1998 | Anthony |
| 5,822,539 A | 10/1998 | Van Hoff |
| 5,848,396 A | 12/1998 | Gerace |

(Continued)

FOREIGN PATENT DOCUMENTS

EP 0778534 A1 6/1997

(Continued)

OTHER PUBLICATIONS

Andreessen, M., "two ideas . . . ", Dec. 14, 1992, [online][Retrieved on Feb. 6, 2001] Retrieved from the Internet<URL:http://lists.w3.org/Archives/Public/www-talk/1992NovDec/0207.html>.

(Continued)

*Primary Examiner*—Isaac M Woo
(74) *Attorney, Agent, or Firm*—Choate Hall & Stewart LLP; Christopher J. McKenna

(57) ABSTRACT

Embodiments of the present disclosure include methods (and corresponding systems and computer program products) that augment visual elements in documents with rich media content and provide the rich media content based on user interaction with the augmented visual elements in the documents. The disclosed embodiments analyze a document for qualified visual elements. The disclosed embodiments determine keywords associated with the visual element, generate an association of the visual element and the keywords, and embed the association in a corresponding augmented document. When a user reviews the augmented document in a client system and moves a pointer over the augmented visual element, a piece of rich media content related to the keywords are transmitted to the client system to be displayed as an overlay in close proximity to the visual element where the mouse-over occurred.

21 Claims, 15 Drawing Sheets

U.S. PATENT DOCUMENTS

| | | | |
|---|---|---|---|
| 5,857,181 | A | 1/1999 | Augenbraun et al. |
| 5,903,889 | A | 5/1999 | De La Huerga et al. |
| 5,948,061 | A | 9/1999 | Merriman et al. |
| 5,963,205 | A | 10/1999 | Sotomayor |
| 5,991,735 | A | 11/1999 | Gerace |
| 5,991,809 | A | 11/1999 | Kriegsman |
| 5,999,912 | A | 12/1999 | Wodarz et al. |
| 5,999,929 | A | 12/1999 | Goodman |
| 6,092,074 | A | 7/2000 | Rodkin et al. |
| 6,098,065 | A | 8/2000 | Skillen et al. |
| 6,098,081 | A | 8/2000 | Heidorn et al. |
| 6,108,703 | A | 8/2000 | Leighton et al. |
| 6,185,598 | B1 | 2/2001 | Farber et al. |
| 6,434,567 | B1 | 8/2002 | De La Huerga |
| 6,434,657 | B1 | 8/2002 | Brown |
| 6,507,837 | B1 | 1/2003 | De La Huerga |
| 6,516,321 | B1 | 2/2003 | De La Huerga |
| 6,574,644 | B2 | 6/2003 | Hsu et al. |
| 6,578,078 | B1 | 6/2003 | Smith et al. |
| 6,581,065 | B1 | 6/2003 | Rodkin et al. |
| 6,606,652 | B1 | 8/2003 | Cohn et al. |
| 6,748,385 | B1 | 6/2004 | Rodkin et al. |
| 6,928,452 | B2 | 8/2005 | De La Huerga |
| 7,257,585 | B2 | 8/2007 | Stevenson et al. |
| 7,305,625 | B1 | 12/2007 | Zilka et al. |
| 7,437,725 | B1 | 10/2008 | Chang et al. |
| 2002/0065136 | A1 | 5/2002 | Day |
| 2002/0143808 | A1 | 10/2002 | Miller et al. |
| 2005/0091111 | A1 | 4/2005 | Green et al. |
| 2005/0125397 | A1 | 6/2005 | Gross et al. |
| 2005/0131884 | A1 | 6/2005 | Gross et al. |
| 2005/0262428 | A1 | 11/2005 | Little et al. |
| 2006/0064411 | A1 | 3/2006 | Gross et al. |
| 2006/0248078 | A1 | 11/2006 | Gross et al. |
| 2006/0282416 | A1 | 12/2006 | Gross et al. |
| 2007/0050711 | A1 | 3/2007 | Walker et al. |
| 2008/0097981 | A1* | 4/2008 | Williams et al. ............... 707/5 |
| 2008/0195603 | A1 | 8/2008 | Gross et al. |
| 2009/0031311 | A1 | 1/2009 | Chang et al. |
| 2009/0171750 | A1 | 7/2009 | Zhou et al. |
| 2009/0171751 | A1 | 7/2009 | Zhou et al. |

FOREIGN PATENT DOCUMENTS

| | | |
|---|---|---|
| EP | 0810520 A1 | 12/1997 |
| WO | WO 97/21183 A1 | 6/1997 |
| WO | WO 98/34168 A2 | 8/1998 |
| WO | WO 01/42947 A2 | 6/2001 |
| WO | WO 01/86390 A2 | 11/2001 |

OTHER PUBLICATIONS

Raggett, D., "Different forms of Annotations", Nov. 23, 1992, [online][Retrieved on Feb. 6, 2001] Retrieved from the Internet<URL:http://lists.w3.org/Archives/Public/www-talk/1992NovDec/0100.html>.

Agosti, M. et al., "Automatic Authoring and Construction of Hypermedia for Information Retrieval," Multimedia Systems, Feb. 1995, pp. 1-19, vol. 3, No. 1, Springer Berlin.

Allan, J., "Automatic Hypertext Construction," Dissertation, Cornell University, Jan. 1995, 128 pages.

Carr, L. et al., "The Evolution of Hypertext Link Services," ACM Computing Surveys, Dec. 1999, vol. 31, No. 4, [Online] [Retrieved on Mar. 31, 2009] Retrieved from the Internet<URL:http://www.cs.brown.edu/memex/ACM_HypertextTestbed/papers/19.htm I>.

Carr, L. et al., "The Microcosm Link Service and its Application to the World Wide Web," In Proceedings of the First International World Wide Web Conference Geneva, 1994, pp. 1-9.

"Cisco DistributedDirector," Posted Feb. 21, 1997, 16 pages, [Online] [Retrieved on Dec. 4, 1997] Retrieved from the Internet<URL:http://www.cisco.com/wart/public/751/distdir/dd_wp.htm>.

Crestani, F. et al., "A Case Study of Automatic Authoring: from a Textbook to a Hyper-Textbook," Submitted to Elsevier Preprint, Oct. 13, 1997, pp. 1-34.

Goldszmidt, G. et al., "Load Distribution for Scalable Web Servers: Summer Olympics 1996—A Case Study," 10 pages.

Holm, R., "A Trip Down Hypermedia Lane," Linux Gazette, May 2002, Issue 78, [Online] [Retrieved on Mar. 31, 2009] Retrieved from the Internet<URL:http://linuxgazette.net/issue78/holm.html>.

Li, Z. et al., "Hypermedia Links and Information Retrieval," Conference, Lancaster University, 1992, pp. 1-11.

Mayfield, J. et al., "Snitch: Augmenting Hypertext Documents with a Semantic Net," International Journal of Intelligent and Cooperative Information Systems, 1993, pp. 1-17.

Thistlewaite, P., "Automatic Construction and Management of Large Open Webs," Information Processing & Management, 1997, pp. 161-173, vol. 33, No. 2.

Yang, J. et al., "From Hypertext to Flat Text: A Tool for Document Construction," AusWeb96, 1996, 9 pages.

Communication Pursuant to Article 96(2) EPC, European Patent Application No. 04756575.9, Dec. 12, 2006, 5 pages.

European Search Report, EP 04 75 6575, Aug. 16, 2006, 3 pages.

Examination Report, New Zealand Patent Application No. 544469, Sep. 7, 2006, 1 page.

File History of U.S. Appl. No. 09/606,422, filed Jun. 29, 2000, 410 pages.

File History of U.S. Appl. No. 11/267,873, filed Nov. 4, 2005, 247 pages.

Notification of Transmittal of the International Search Report And The Written Opinion Of The International Searching Authority, or the Declaration, PCT/US2004/021294, Feb. 14, 2005.

International Preliminary Report on Patentability, PCT Application No. PCT/US2004/021294, Jan. 12, 2006, 11 pages.

International Search Report for WO 2001/086390 A3.

Notice of Preliminary Rejection, Korean Patent Application No. 10-2005-7025307, May 17, 2007, 6 pages.

Wyman, B., "Random Link Insertion into a Webpage," Computer Language Javascript, Sep. 25, 1996, [online] [Retrieved on Jul. 31, 2006] Retrieved from the Internet <URL:http://groups.google.com/group/comp.lang.javascript/browse_thread>.

PCT International Search Report and Written Opinion, PCT/US08/82819, Mar. 16, 2009, 7 pages.

Irwin, T. et al., "ValueClick To Launch Predictive Behavioral Targeting," Jul. 21, 2008, [online] [Retrieved on Aug. 14, 2008] Retrieved from the Internet<URL:http://www.mediapost.com/publications/?fa=Articles.san&s=86905&Nid=45235&p=118697>.

* cited by examiner

INTELLIGENT AUGMENTATION OF MEDIA CONTENT

CROSS-REFERENCE TO RELATED APPLICATIONS

This application claims the benefit of U.S. Provisional Patent Application Ser. No. 60/986,965, entitled "Intelligent Augmentation of Media Content," by Richard Brindley, filed on Nov. 9, 2007, which is hereby incorporated by reference in its entirety.

BACKGROUND

1. Field of Disclosure

The disclosure generally relates to the field of data augmentation, in particular to augmenting non-textual content in documents.

2. Description of the Related Art

As the cost associated with network storage reduces and the number of users having high-speed network access grows, more and more content providers place rich visual content (e.g., still images, videos) in their web pages. In addition, content providers often place advertisements in their web pages to generate advertising revenue. However, advertisements usually occupy prominent spaces in web pages. In addition, advertisements tend to interrupt content arrangement in the web pages and distract viewers.

Thus, the art lacks a system and method for augmenting visual content in web pages and providing augmented data based on the visual content.

SUMMARY

Embodiments of the present disclosure include methods (and corresponding systems and computer program products) that augment visual elements in documents with rich media content and provide the rich media content based on user interaction with the augmented visual elements in the documents.

The disclosed embodiments analyze a document for qualified visual elements. The disclosed embodiments determine keywords associated with the visual element, generate an association of the visual element and the keywords, and embed the association in a corresponding augmented document. When a user reviews the augmented document in a client system and moves a pointer over the augmented visual element, a piece of rich media content related to the keywords is transmitted to the client system. The related rich media content can be displayed as an overlay in close proximity to the visual element where the mouse-over occurred.

Advantages of the disclosed embodiments include providing content providers with additional channels for delivering relevant advertisements and other augmented data to viewers. The disclosed embodiments also enhance viewers' web browsing experience by providing rich media overlays without the need to leave their current web page. In addition, the disclosed embodiments provide additional rich media content on a web page without requiring a media player at a fixed location on the web page.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying drawings. A brief description of the drawings is below:

DETAILED DESCRIPTION

The disclosed embodiments describe examples of a method (and corresponding system and computer program product) for augmenting visual elements in documents with rich media content and delivering the rich media content based on user interaction with the augmented visual elements in the documents. The visual elements include images, videos, and other graphical display (e.g., animations such as Flash). The documents include any form of documents such as web pages. The rich media content includes services (e.g., convenient Internet search service), hyperlinks, graphical displays, video playbacks, and advertisements. For purposes of illustration, the method (and corresponding system and computer program product) is described in terms of augmenting images in web pages with advertisements and delivering the advertisements based on user interactions with the augmented images, even though the disclosed embodiments applies to all other types of visual elements, documents, and rich media content as defined above.

The figures and the following description relate to preferred embodiments by way of illustration only. Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. It should be noted that from the following discussion, alternate embodiments of the structures and methods disclosed herein will be readily recognized by one skilled in the art as viable alternatives that may be employed without departing from the principles described herein.

Computing Environment

Figure 1:
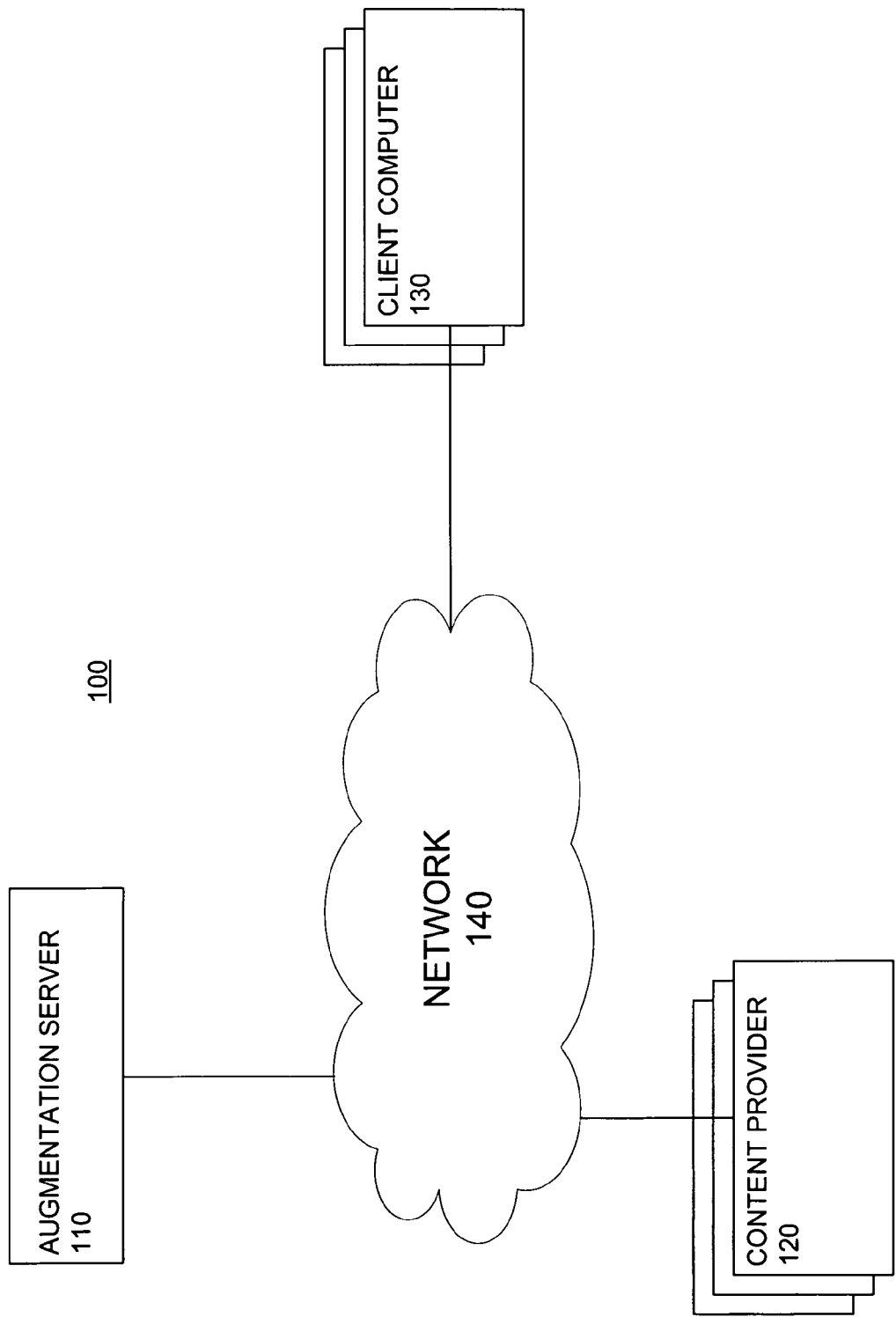
FIG. 1 illustrates one embodiment of a computing environment for augmenting visual elements in documents with rich media content and delivering the rich media content based on user interaction with the augmented visual elements in the documents.

FIG. 1 illustrates one embodiment of a computing environment 100 for augmenting images in web pages with advertisements and delivering the advertisements based on user interaction with the augmented images. As illustrated, the computing environment 100 includes an augmentation server 110, multiple content providers (or websites) 120, and one or more client computers (or user systems) 130, all of which are communicatively coupled through a network 140.

The augmentation server 110 is configured to augment images (and other types of visual elements) in web pages (and other types of documents) with advertisements (and other types of rich media content), and deliver the advertisements based on user interaction with the augmented images. The augmentation server 110 retrieves web pages from the content providers 120 and augments the web pages. The augmentation server 110 augments a web page by analyzing it for qualified images and their one or more related contexts and subjects, associating (or tagging) the images with one or more related contexts and subjects, and storing the associations in a database. When a user views an augmented web page in a client computer 130 and moves a pointer over one of the tagged (or augmented) images (hereinafter "the active image"), the augmentation server 110 provides an advertisement related to the context and/or subject of the active image for display in the client computer 130 as an overlay of the active image. An example architecture of the augmentation server 110 is described in detail below with respect to FIG. 2.

The content providers 120 are entities that provide (or generate), host, publish, control, or otherwise have rights over a collection of web pages (or other types of documents). In one embodiment, the content providers 120 are web servers hosting web pages for viewers to access. The content providers 120 may provide web pages to the augmentation server 110 for augmentation. Alternatively, the content providers 120 may either instruct or give permission to the augmentation server 110 to retrieve all or parts of their web pages for augmentation.

The client computers 130 are client devices for users to browse web pages (or other types of documents). In one embodiment, a client computer 130 includes a pointer device (e.g., a mouse, a trackball, a roller, a touchpad, or the like), a conventional web browser (e.g., Microsoft Internet Explorer™, Mozilla Firefox™, or Apple Safari™), and can retrieve and display web pages from the content providers 120 in a conventional manner (e.g., using the HyperText Transfer Protocol). In one embodiment, the client computer 130 displays an augmented web page in a manner identical (or substantially similar) to the corresponding original web page. When a user moves a pointer (e.g., mouse pointer) over an augmented image in the augmented web page, the client computer 130 (or the utilized web browser) generates a request and transmits the request to the augmentation server 110 for a relevant advertisement. The client computer 130 (or the utilized web browser) displays the retrieved advertisement as an overlay proximate to the active image.

The network 140 is configured to communicatively connect the augmentation server 110, the content providers 120, and the client computers 130. The network 140 may be a wired or wireless network. Examples of the network 140 include the Internet, an intranet, a WiFi network, a WiMAX network, a mobile telephone network, or a combination thereof.

In one embodiment, the augmentation server 110, the content providers 120, and/or the client computers 130 are structured to include a processor, memory, storage, network interfaces, and applicable operating system and other functional software (e.g., network drivers, communication protocols).

Example Augmentation Server Architectural Overview

Figure 2:
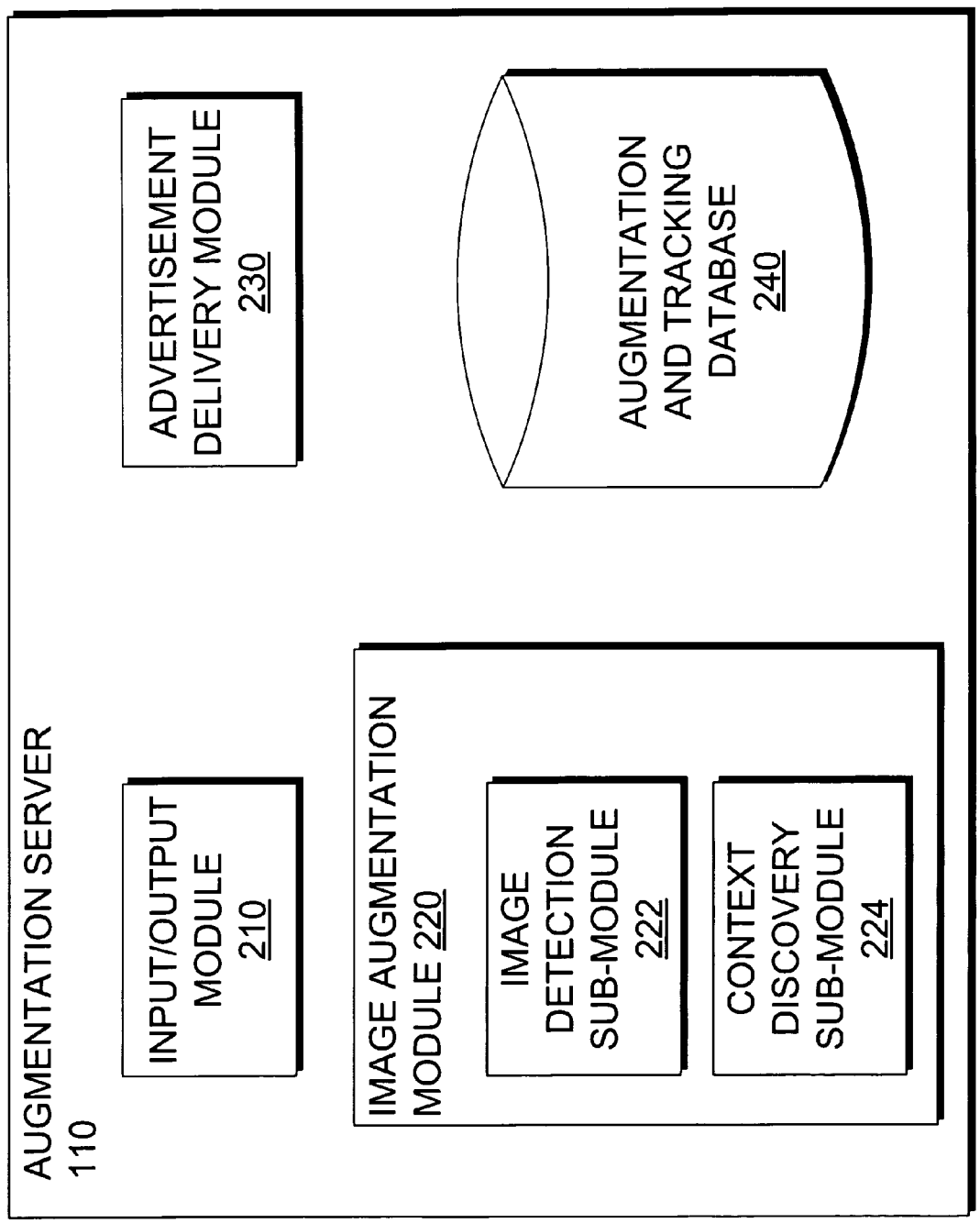
FIG. 2 illustrates one embodiment of an architecture of an augmentation server as shown in, for example, FIG. 1.

Referring next to FIG. 2, a block diagram illustrating an example architecture of the augmentation server 110 shown in FIG. 1. As illustrated, the augmentation server 110 includes an input/output module 210, an image augmentation module 220, an advertisement delivery module 230, and an augmentation and tracking database 240. The modules 210 through 240 may include a software or firmware instruction that can be stored within a tangible computer readable medium (e.g., magnetic disk drive, flash memory, or random-access memory) and executed by a processor or equivalent electrical circuits, microcode, or the like.

The input/output module 210 is configured to communicate with external devices (or entities) such as the content providers 120 and the client computers 130 through communication channels such as the network 140. In one embodiment, the input/output module 210 receives web pages (or other types of documents) from the content providers 120, or retrieves (or crawls) websites for web pages. The input/output module 210 transmits to the content providers 120 augmented web pages or information enabling the content providers 120 to augment the web pages. The input/output module 210 also receives requests (or signals) from client computers 130 indicating user interactions with the augmented web pages, and transmits to the client computers 130 related advertisements for display.

The image augmentation module 220 is configured to augment images (and other types of visual elements) in web pages (and other types of documents) with advertisements (and other types of rich media content). As illustrated, the image augmentation module 220 includes an image detection sub-module 222 and a context discovery sub-module (or knowledge engineering module) 224. The image detection sub-module 222 is configured to detect qualified images in the web pages. One embodiment of a detailed operation for the image detection sub-module 222 to detect qualified images is described in detail below with respect to FIG. 3.

The context discovery sub-module 224 is configured to identify contexts and/or subject keywords related to the qualified images in the web pages. A context of a web page (or an image) is a circumstance relevant to the content of the web page (or the subject of the image). A subject of an image is a subject matter of the content of the image. An image may have one or more contexts and/or subjects. A context and/or a subject can be defined (or described) using one or more keywords. As used herein, both context keywords and subject keywords are collectively called keywords for ease of discussion. The context discovery sub-module 224 may process information associated with the image to identify related keywords. Alternatively (or in addition), the context discovery sub-module 224 may receive context information from the content providers 120. One embodiment of a detailed operation for the context discovery sub-module 224 to identify keywords is described in detail below with respect to FIG. 4.

The image augmentation module 220 is configured to generate intelligent tags for the qualified images, and augment the qualified images with the intelligent tags. In one embodiment, an intelligent tag uniquely identifies its associated image (and optionally the associated web page). An intelligent tag may also include some or all of the identified keywords identified for the associated image. The image augmentation module 220 may integrate the intelligent tags into the web pages or provide them to the content providers 120 for integration. Web pages with the integrated intelligent tags are called augmented web pages. Images with the integrated intelligent tags are called augmented images. The image augmentation module 220 also stores the identified keywords together with identifiers of the associated images in the augmentation and tracking database 240 for later references.

The advertisement delivery module 230 is configured to provide related advertisements (or other types of rich media content) based on user interaction with augmented images in augmented web pages. The advertisement delivery module 230 receives an intelligent tag request indicating a user interaction with an augmented image (e.g., moving a mouse pointer over the augmented image) from a client computer 130 through the input/output module 210. The advertisement delivery module 230 retrieves keywords associated with the active image, and determines one or more relevant advertisements matching the keywords in an advertising database (not shown). The advertisement delivery module 230 provides the relevant advertisements to the requesting client computer 130 for display. Alternatively, the advertisement delivery module 230 transmits addresses (e.g., Universal Resource Locator (URL)) of the relevant advertisements to the requesting client computer 130 for retrieval.

The augmentation and tracking database 240 (hereinafter "the database 240") is configured to store identifiers of the augmented images (e.g., URL) and the associated keywords. In one embodiment, the database 240 also serves as the advertising database and hosts a table of advisement identifiers, their addresses, format information, and associated keywords.

The components of the augmentation server 110 can reside on a single computer system or several computer systems located close by or remotely from each other. For example, the image augmentation module 220 and the advertisement delivery module 230 may reside on separate web servers, and the database 240 may be located in a dedicated database server. In addition, any of the components or sub-components may be executed in one or multiple computer systems.

Overview of Methodology

Figure 3:
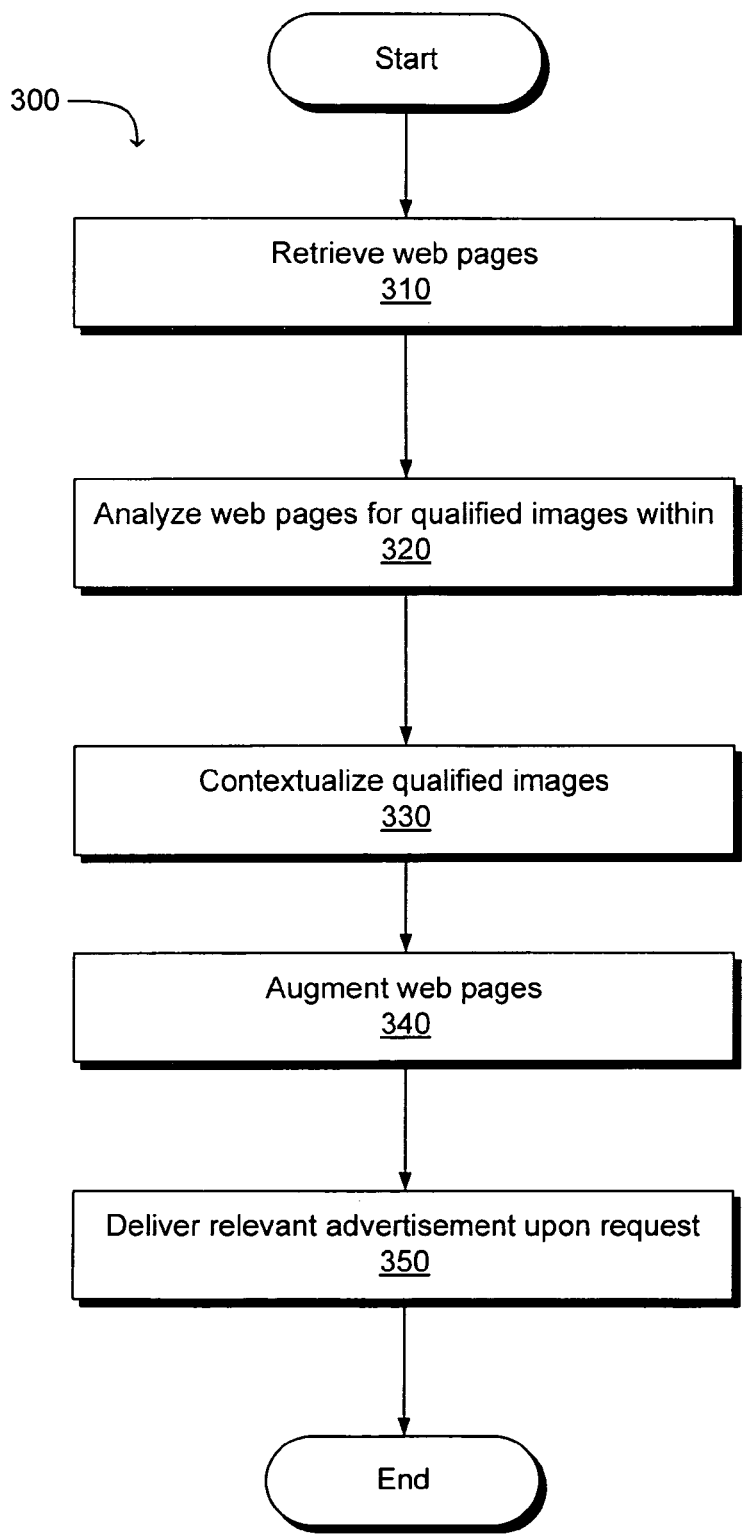
FIGS. 3-5 are flowcharts illustrating one embodiment of a method for augmenting images in web pages with advertisements and delivering the advertisements based on user interactions with the augmented images.
Figure 4:
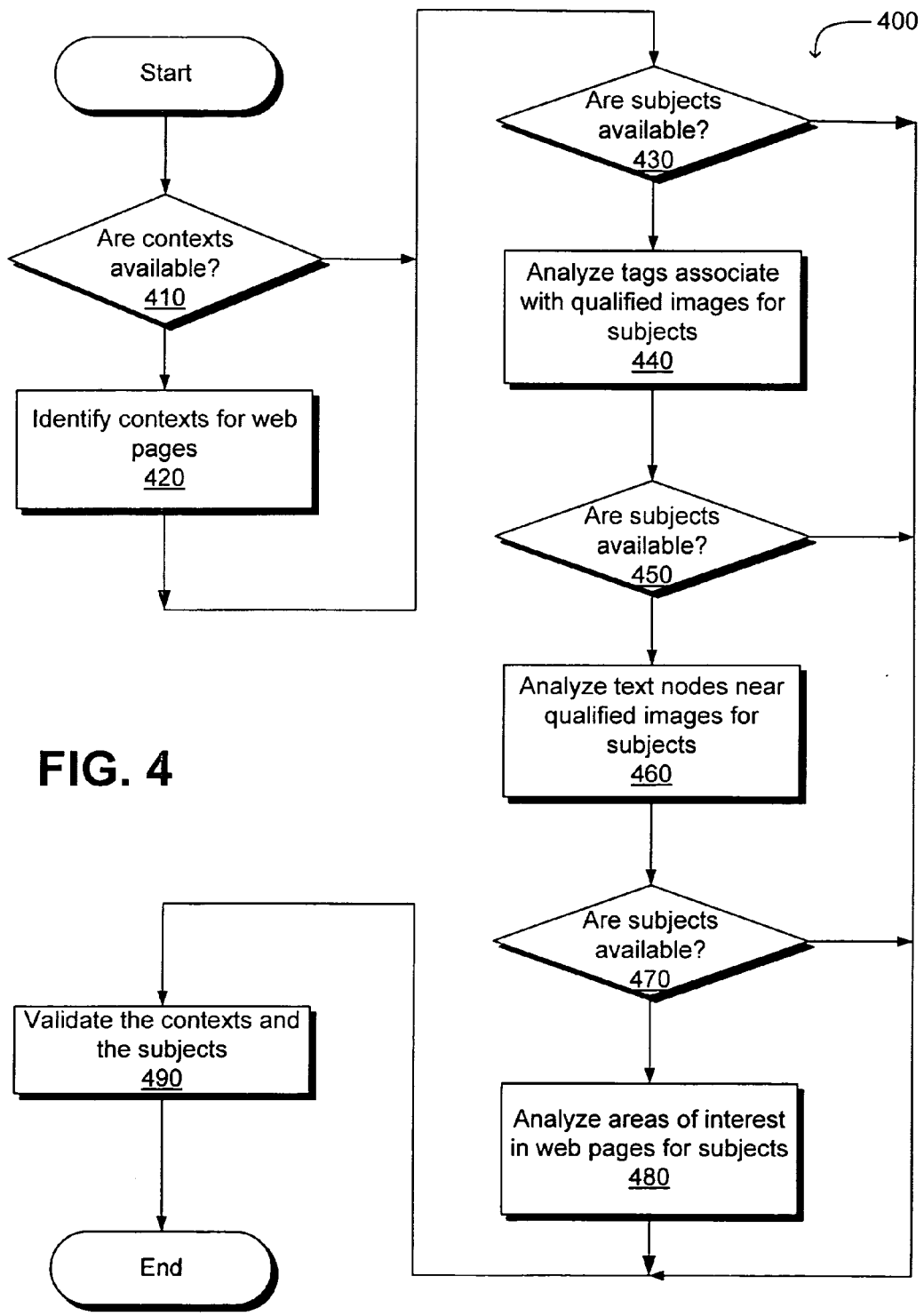
Figure 5:
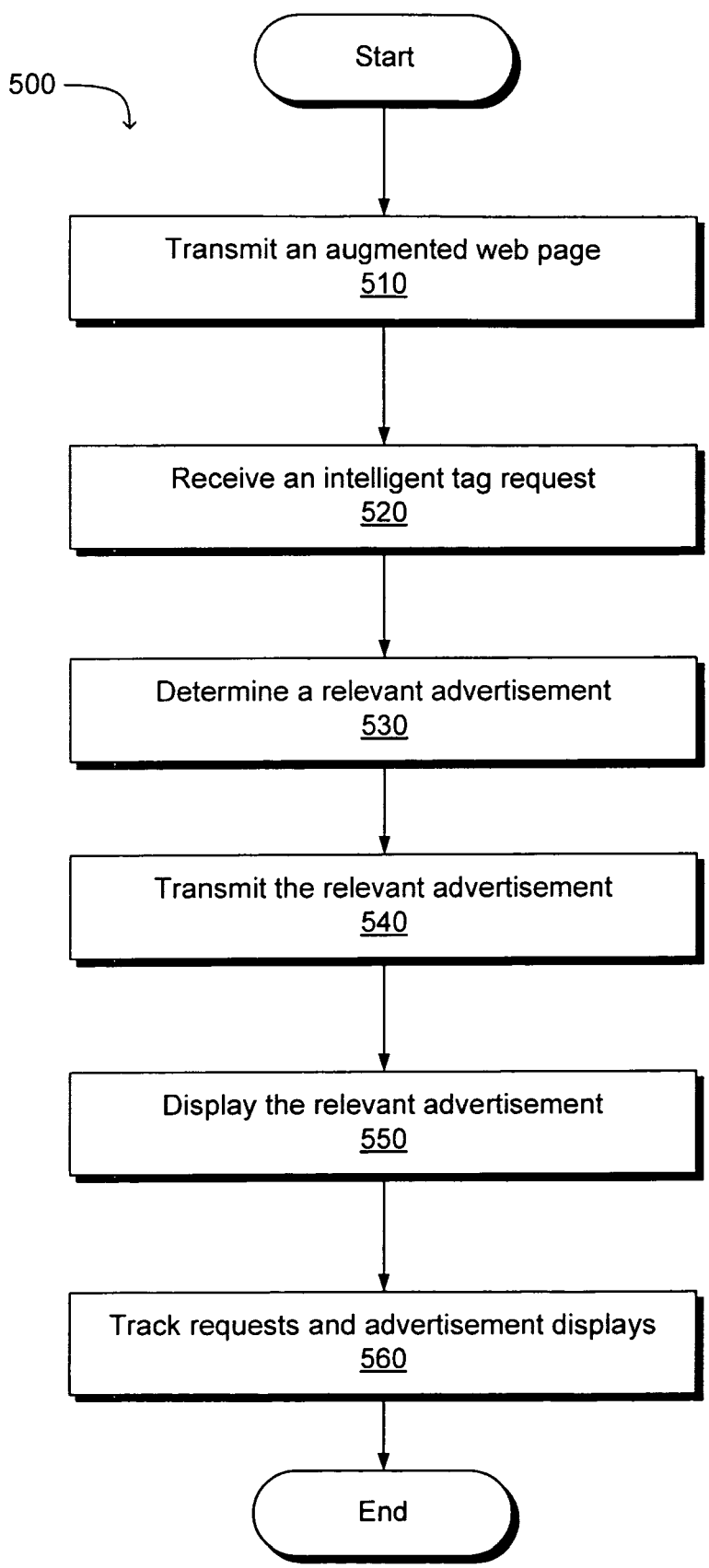
Figure 6B:
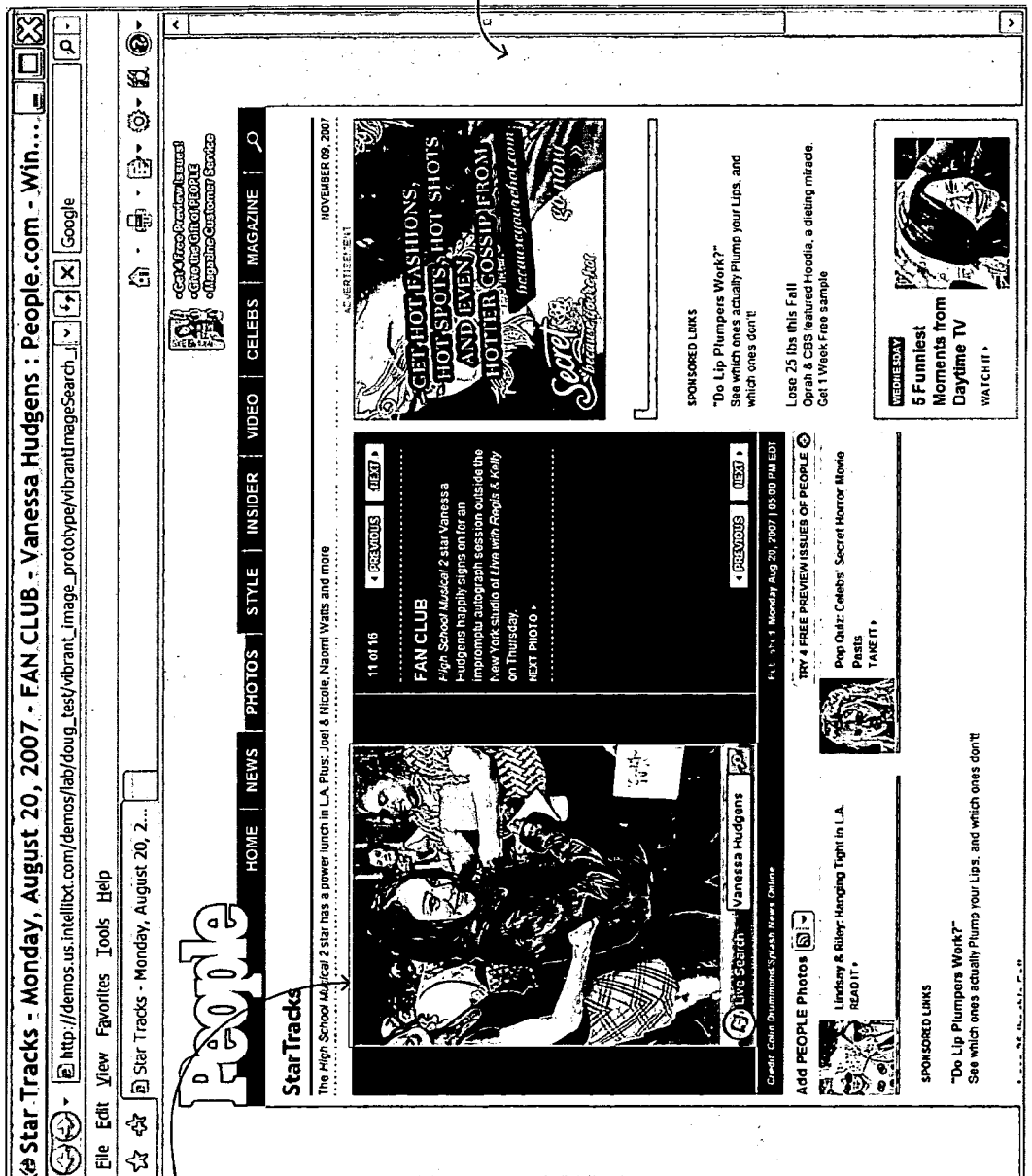
FIGS. 6(*a*) through 6(*j*) are screenshots illustrating a web page, its corresponding augmented web page, and a viewer's user experience interacting with the augmented web page according to one embodiment of the present disclosure.
Figure 6C:
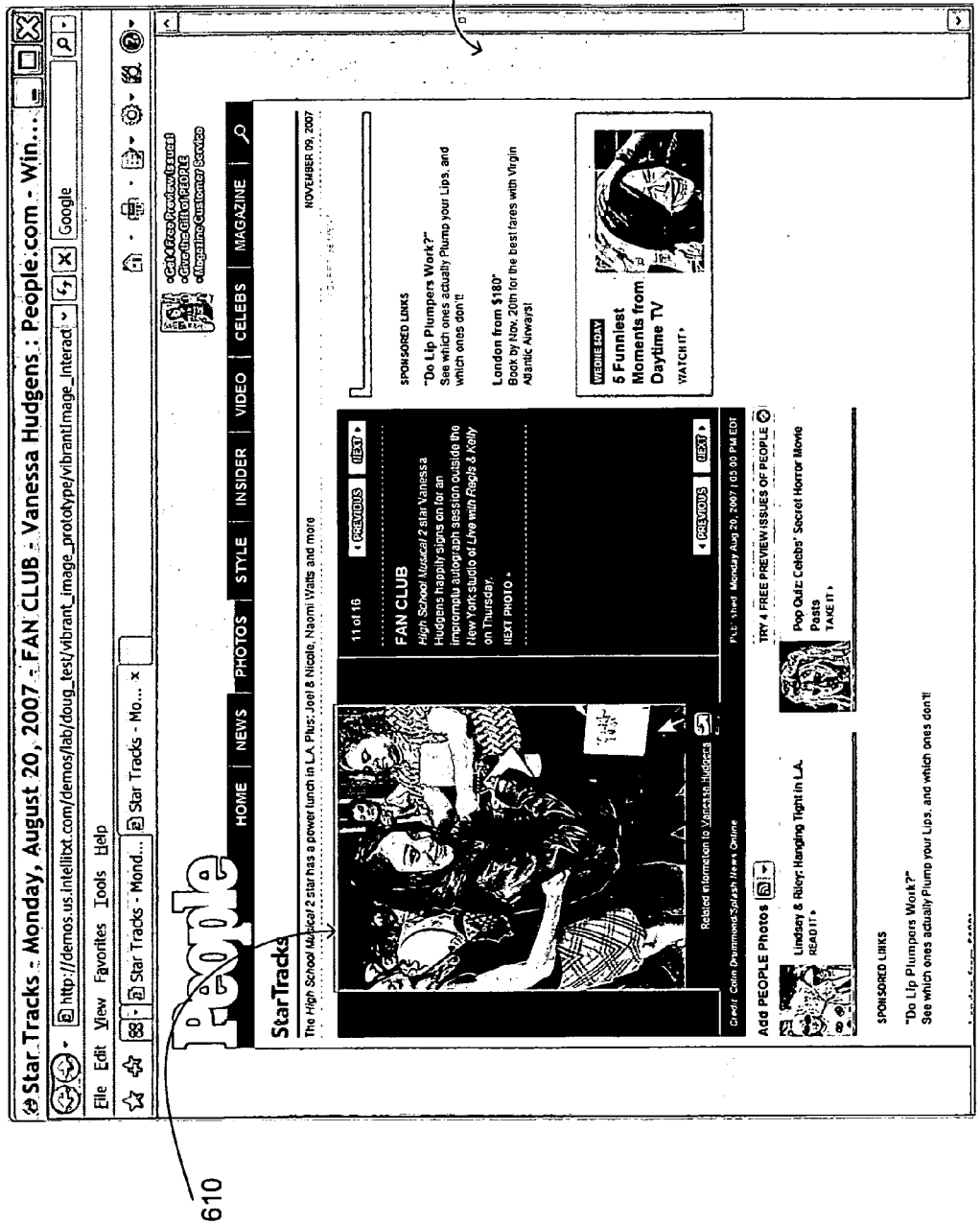
Figure 6D:
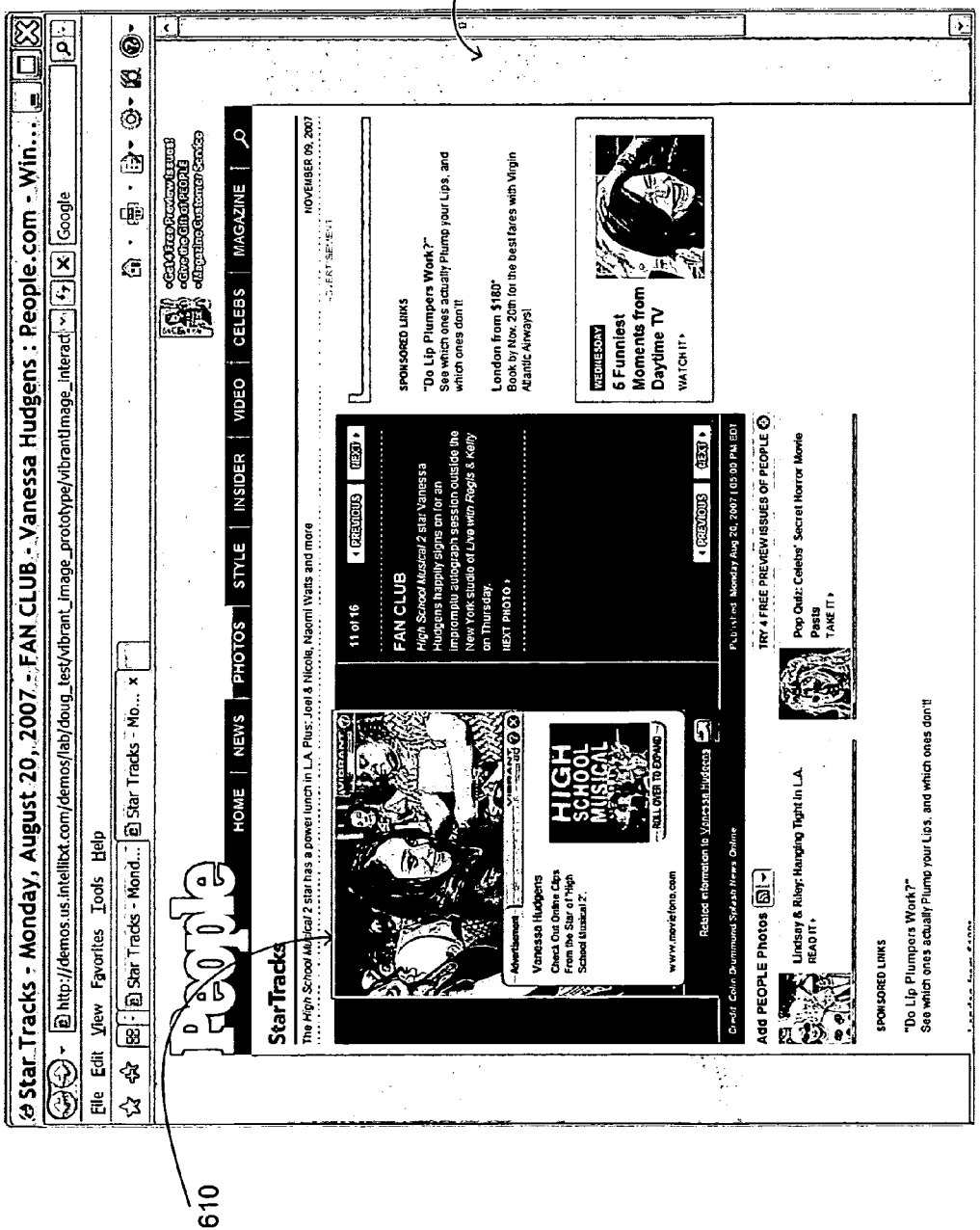
Figure 6E:
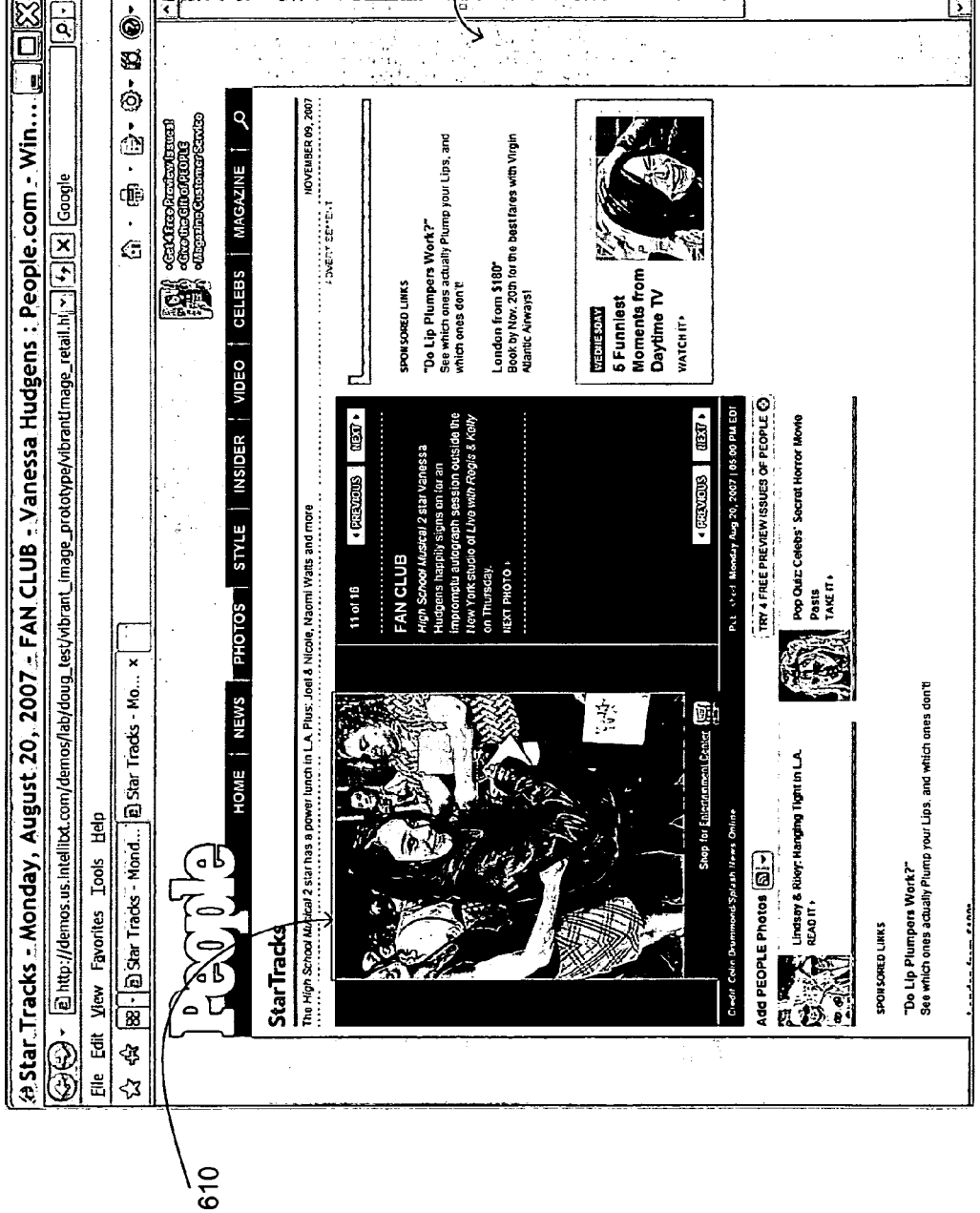
Figure 6F:
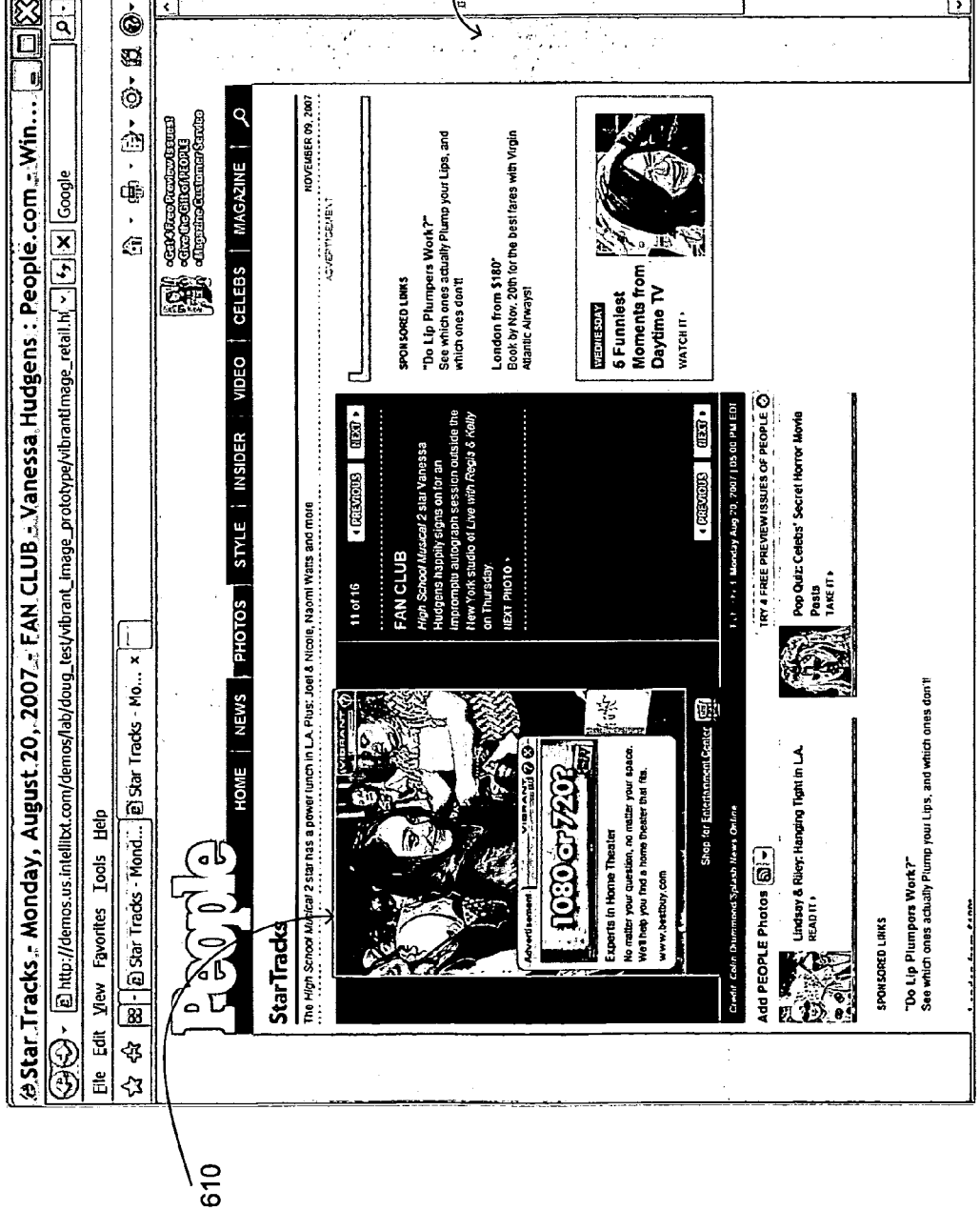
Figure 6G:
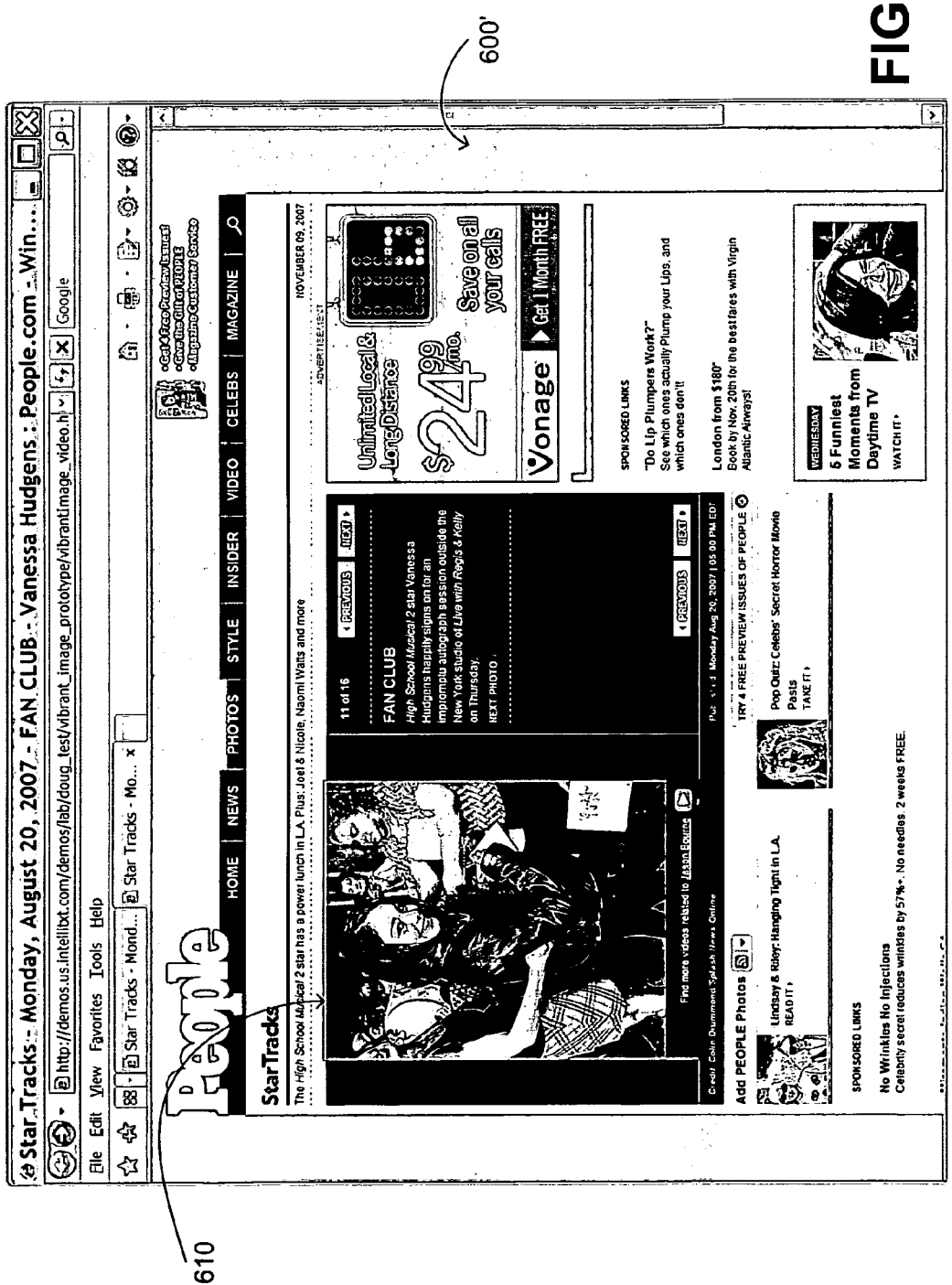
Figure 6H:
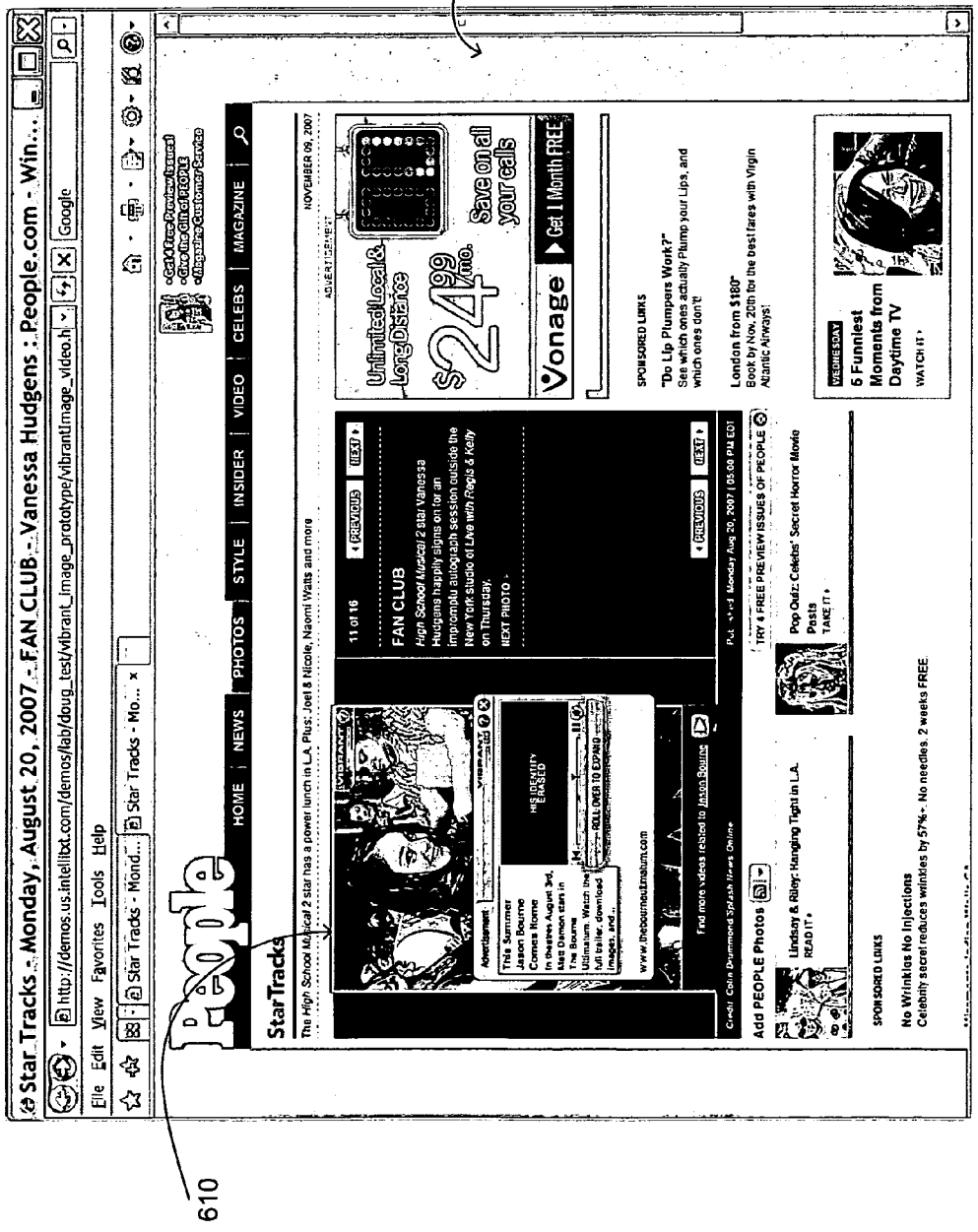
Figure 6I:
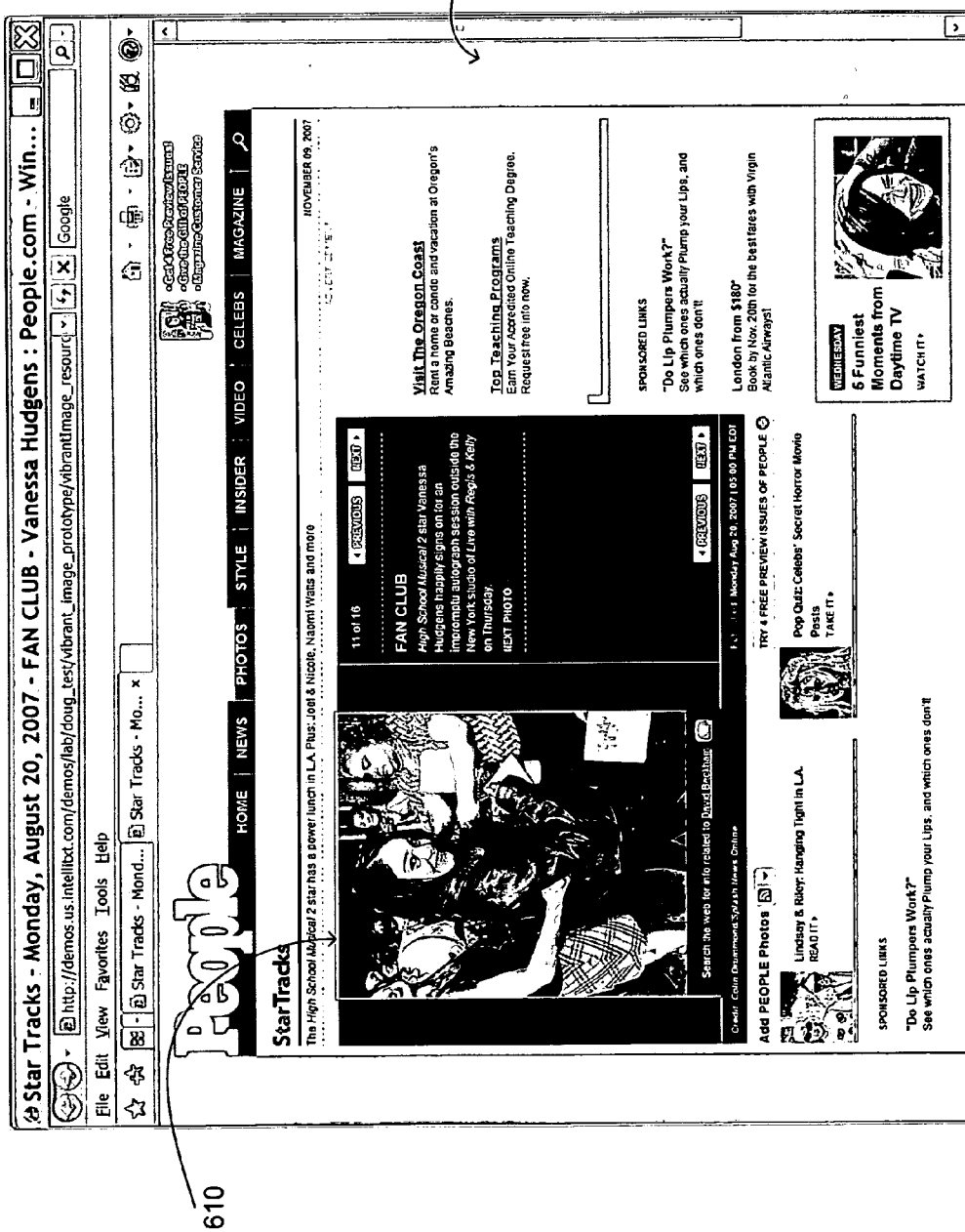

Referring next to FIGS. 3 through 5, flowcharts collectively illustrate an example method (or process) for augmenting images in web pages with advertisements and delivering the advertisements based on user interactions with the augmented images.

In one embodiment, the illustrated method (or any of the sub-methods 300, 400, and 500) is implemented in a computing environment such as the computing environment 100. One or more portions of the method may be implemented in embodiments of hardware and/or software or combinations thereof. By way of example, the illustrated method may be embodied through instructions for performing the actions described herein and such instrumentations can be stored within a tangible computer readable medium and are executable by a processor. Alternatively (or additionally), the illustrated method may be implemented in modules like those in the augmentation server 110 described above with respect to FIGS. 1 and 2 and/or other entities such as the content providers 120 and/or the client computers 130. Furthermore, those of skill in the art will recognize that other embodiments can perform the steps of the illustrated method in different order. Moreover, other embodiments can include different and/or additional steps than the ones described here.

As illustrated in FIG. 3, initially, the augmentation server 110 retrieves 310 web pages from the content providers 120 (e.g., through the input/output module 210). The content providers 120 may provide web pages for augmentation to the augmentation server 110 (e.g., by transmitting the web pages to the augmentation server 110). Alternatively, the augmentation server 110 may crawl websites to retrieve 310 web pages. For example, the content providers 120 may either instruct or give permission to the augmentation server 110 to retrieve all or parts of their web pages for augmentation. Accordingly, the augmentation server 110 retrieves 310 the web pages as identified by the content providers 120.

The augmentation server 110 analyzes 320 the retrieved web pages for qualified images within the web pages (e.g., through the image detection sub-module 222). In one embodiment, the augmentation server 110 enumerates through all images in the web pages for those that meet predefined criteria. The predefined criteria for qualified images include limitations such as a minimum width and a minimum height. Small (or flat or narrow) images tend not to be images of viewer's interest (e.g., border line patterns). Only images equal to or exceed the minimum width and height are potentially qualified images. The predefined criteria may also disqualify certain types of images (e.g., advertising images, background images, clickable images, or images that are otherwise associated with certain tags). The predefined criteria are customizable and the augmentation server 110 may apply different sets of predefined criteria for different content providers 120 based on customer requests and/or needs.

The augmentation server 110 contextualizes 330 the qualified images in the web pages (e.g., through the context discovery sub-module 224). In one embodiment, the augmentation server 110 determines (or identifies) context keywords and/or subject keywords for each qualified image in the web pages. The contextualization step 330 is further described with respect to FIG. 4.

Referring now to FIG. 4, a flowchart illustrating an example method 400 for the augmentation server 110 to contextualize 330 a qualified image in a web page. As illustrated, the augmentation server 110 determines 410 whether contexts for the web page (or the qualified image) are available. As defined above with respect to the context discovery sub-module 224 in FIG. 2, a context of a web page (or image) is a circumstance relevant to the content of the web page (or the subject of the image). A web page (or image) can have zero, one, or more contexts. A context can be defined or described using one or more keywords. For example, a web page about the life of the world-renowned author Ernest Hemingway may have a context of "literature." The augmentation server 110 may determine 410 whether contexts of the web page (or the qualified image) are available from its content provider 120. If the augmentation server 110 determines 410 that the contexts are available, it retrieves the available contexts and proceeds to determine 430 whether subjects for the qualified image are available, as described in detail below.

If the augmentation server 110 determines 410 that the contexts are not available, it identifies 420 contexts for the web page (or the qualified image) by analyzing content of the web page. In one embodiment, the augmentation server 110 uses natural language processing technologies to process textual content of the web page to determine contexts of the web page (or the qualified image). For example, if the web page contains content about works and life of Ernest Hemingway, the augmentation server 110 identifies 420 a literature context for the web page and/or the enclosed qualified image. Alternatively (or in addition), the augmentation server 110 can analyze related web pages (e.g., web pages linking to/from the web page, or web pages from the same web site) to identify 420 a particular context or contexts.

The augmentation server 110 determines 430 whether subjects of the qualified image are available. As defined above with respect to the context discovery sub-module 224 in FIG. 2, an image may have one or more subjects described by one or more keywords. For example, a photograph of Ernest Hemingway may have a subject keyword of "Ernest Hemingway," "author," or both. The augmentation server 110 may determine 430 whether subjects of the qualified image are available from its content provider 120. If the augmentation server 110 determines 430 that the subjects are available, it retrieves the available subjects and proceeds to validate 490 the contexts and/or the subjects, as described in detail below.

If the augmentation server 110 determines 430 that the subjects are not available, it analyzes 440 tags associated with the qualified image. In one embodiment, the augmentation server 110 extracts ALT tags associated with the qualified image for the subjects. An ALT tag is a HTML tag that provides alternative text for non-textual elements, typically images, in an HTML document (e.g., a web page). ALT tags are often used to provide descriptive information of the associated images. If the qualified image has associated ALT tags available, the augmentation server 110 analyzes their contents to extract relevant subject keywords.

The augmentation server 110 determines 450 whether the subjects for the qualified image are available from the associated ALT tags. If the augmentation server 110 extracts subjects by analyzing 440 ALT tags associated with the qualified image, it proceeds to validate 490 the contexts and/or the subjects, as described in detail below.

If the qualified image has no associated ALT tags, or the augmentation server 110 fails to extract any subject keywords from the ALT tags (e.g., the associated ALT tags contain no relevant keywords), the augmentation server 110 analyzes 460 contents of text nodes physically close to the qualified image on the web page for relevant subjects. For example, the augmentation server 110 may analyze the associated caption, descriptive text, hyperlink references (or anchor texts). For example, in a web page about Ernest Hemingway, a photograph of the famous writer has a caption of "Photograph of Ernest Hemingway aboard his yacht" and is the destination of a hyperlink with anchor text "Ernest Hemingway in his 50's." The augmentation server 110 may use the caption and/or the anchor text to determine subjects for the photograph. In one embodiment, the augmentation server 110 may be configured to restrict the number of paragraphs to be analyzed for subjects in a web page to prevent identifying too many subjects. In one embodiment, the augmentation server 110 uses hyperlinks (e.g., other hyperlinks to the image from other pages) to determine subjects for the qualified image.

The augmentation server 110 determines 470 whether the subjects of the qualified image are available from the nearby text nodes. If the augmentation server 110 identifies subjects by analyzing 460 nearby text nodes, it proceeds to validate 490 the contexts and/or the subjects, as described in detail below.

If the augmentation server 110 fails to identify subjects of the qualified image by analyzing 460 nearby text nodes, the augmentation server 110 analyzes 480 areas of interest in the web page for the subjects. An area of interest is a field (e.g., a markup field such as a heading or a title) of the web page containing information relevant to the qualified image. The area of interest may be provided by the content provider 120 or identified by the augmentation server 110 (e.g., by analyzing web pages from the same web site). The augmentation server 110 analyzes 480 the areas of interest in the web page to identify subjects for the qualified image.

The augmentation server 110 validates 490 the identified (or determined) contexts and/or the subjects. In one embodiment, the augmentation server 110 verifies the integrity (and quality) of the contexts and the subjects. For example, the augmentation server 110 may determine whether the subjects (e.g., Ernest Hemingway) and the contexts (e.g., literature) are relevant. If they are not relevant, the augmentation server 110 may determine that the subjects and/or the contexts are considered not valid and may repeat the process 400. In one embodiment, the augmentation server 110 may determine a relevance of the context keywords and/or the subject keywords with the qualified image in view of the analyzed text, and sort them by relevance.

It is noted that in one embodiment, the contexts and/or the subjects are determined even if they are provided by the content provider. In one embodiment, two or more steps of determining subjects 440, 460, 480 are executed even if subjects are determined 430 available or identified by one or more of the steps 440, 460, 480. In one embodiment, if contexts and/or subjects are determined to be not valid, the augmentation server 110 proceeds with one or more of the following steps: ignoring (or removing) the not valid keywords; repeating the process 400; or disqualifying the web page and/or the qualified image.

Referring back to FIG. 3, the augmentation server 110 augments 340 the web pages with intelligent tags (e.g., through the image augmentation module 220). The augmentation server 110 generates intelligent tags for the qualified images based on their identified keywords, and tags the qualified images with the generated intelligent tags. The intelligent tags contain information about the associated qualified images, such as subject keywords, context keywords, and image identifiers. The intelligent tags may contain multiple sections (hereinafter called IntelliImage sections) for additional information. For example, the intelligent tags may contain requirement (or preference) information about rich media content to be associated with the image, such as types of advertisements or rich media content, and whether the qualified image is clickable.

In one embodiment, the augmentation server 110 integrates the intelligent tags into the web pages as image tags associated with the qualified images. For example, for an image of an Apple iPhone™, the augmentation server 110 may place an intelligent tag with subject keywords "Apple iPhone" in an ALT tag in the accompanying IMG tag, as illustrated below.

<IMG SRC="phone.jpg" ALT="Apple iphone">

Alternatively, the augmentation server 110 may add the intelligent tag in a different section or tag associated with the qualified image. In one embodiment, the augmentation server 110 transmits the intelligent tags (or their contents) to the content provider 120 for integration. In one embodiment, the intelligent tags do not affect the display of the augmented web pages.

In one embodiment, the augmentation server 110 (or the content providers 120) also augments the web pages by including computer code (hereinafter called client code) to monitor and report viewers' interactions with the augmented images. The computer code can be in any computer language, such as JavaScript. Additional functions of the client code are described in detail below with respect to FIG. 5.

The augmentation server 110 stores information about the augmentation in the database 240 for future reference. The stored information includes information about the augmented web pages (e.g., their URL and included augmented images), the augmented images (e.g., their size, type, resolution, image identifier, whether clickable, or identified context and subject keywords), and the related advertisements (e.g., types of the advertisements).

The augmentation server delivers 350 relevant advertisements responding to user interaction with augmented images. The delivery step 350 is described in detail below with respect to FIG. 5.

Referring now to FIG. 5, a flowchart illustrating an example method 500 for the augmentation server 110 to deliver 350 a relevant advertisement responding to a user interaction with an augmented image in an augmented web page. As illustrated, a content provider 120 (or a related entity, such as a web hosting provider) transmits 510 an augmented web page to a client computer 130. For example, a user of the client computer 130 may enter the URL of an augmented web page (or the corresponding original web page) in the address bar of a conventional web browser (e.g., Microsoft Internet Explorer™, Mozilla Firefox™, or Apple Safari™). The web browser of the client computer 130 (hereinafter called the client web browser) consequently transmits a request for the web page to a corresponding content provider 120. Responding to the request, the content provider 120 transmits 510 the augmented web page to the client web browser for display. In one embodiment, the client web browser displays augmented images in the web pages in a manner identical to (or closely resembles) corresponding original images. In other embodiment, the augmented image may be highlighted in the augmented web page as displayed in the client web browser.

The augmentation server 110 receives 520 an intelligent tag request from the client computer 130. As described above with respect to FIG. 3, the augmented web page contains client code that monitors user interactions with augmented images. In one embodiment, if the user moves a pointer (e.g., mouse pointer or touchpad) over an augmented image (the active image), the client code (or the web browser) generates an intelligent tag request and transmits the request to the augmentation server 110. The request indicates the mouse-over user activity to the augmentation server 110. The request may contain information that uniquely identifies the active image (e.g., an image identifier such as an URL), and/or other information such as associated advertisement types.

The augmentation server 110 determines 530 an advertisement relevant to the active image for the received request based on keywords associated with the active image. The augmentation server 110 extracts the image identifier from the request, and retrieves corresponding keywords and/or other information (e.g., image size or advertisement type) for the active image from the database 240. The augmentation server 110 determines 530 an advertisement related to the retrieved keywords by searching for the advertisement in an advertisement database using retrieved keywords. In one embodiment, the augmentation server 110 identifies the advertisement that matches the best (e.g., matching the most number of keywords or matching the most important keywords) as the relevant advertisement. In one embodiment, the augmentation server 110 only searches for advertisements that match the advertisement type and/or other requirements associated with the active image (e.g., image size).

In one embodiment, the augmentation server 110 generates computer code (hereinafter called the advertisement code) to facilitate user interaction with the advertisement. Similar to the client code, the advertisement code can be in any computer language, such as JavaScript. For example, the advertisement code may overlay the active image with an advertisement banner, and displays the advertisement in a popup box when the user moves a pointer over the banner. The advertisement code may also make the advertisement clickable through to the advertiser's destination page. In addition, if the advertisement contains video, the advertisement code may overlay the active image with a video player with video controls (e.g., forward, rewind, play/pause, volume, etc.).

The augmentation server 110 transmits 540 the relevant advertisement to the client computer 130 for display. In one embodiment, the augmentation server 110 retrieves the advertisement from a database hosting the advertisement (e.g., the advertising database), and transmits 540 it to the client web browser (or the client computer 130) for display. Alternatively, the augmentation server 110 may transmits a reference of the advertisement (e.g., its URL) to the client web browser for retrieval. The augmentation server 110 also transmits the generated advertisement code to the client web browser.

In one embodiment, the client web browser displays 550 the relevant advertisement proximate to the active image as an in-image overlay. As noted above, the augmentation server 110 may augment images (or other visual elements) with rich media content. Examples of the rich media content include search mechanisms, videos, and interactive advertisements. In one embodiment, the client web browser overlays a banner on the active image with information about the accompanying rich media content. The banner may include a hook icon that relates to the type of rich media content being shown. For example, the hook icon for search mechanisms is a magnifying glass, the hook icon for video displays is a video control such as a play button, and the hook icon for shopping advertisements is a shopping cart icon, and the hook icon for all other types of rich media content can be an arrow icon. When a user moves a mouse over the hook icon, a popup box will be displayed proximate to the position where the mouse-over is occurring. The rich media content (e.g., the relevant advertisement) is displayed in the popup box. The popup box may integrate controls to the users. For example, if rich media such as video is served, the JavaScript code may integrate in rich media controls (e.g., forward, rewind, play/pause, volume, etc.). It is noted that in alternate embodiments the rich media can be immediately played in response to mouse-over within close proximity to the banner and/or the popup box. The overlaid banner and popup box may be generated or otherwise controlled by the advertisement code or the client code.

In one embodiment, the displayed rich media content is a search mechanism with a search box for users to enter query terms. For user's convenience, the search mechanism may pre-enter relevant search terms in the search box. The pre-entered search terms may include keywords identified for the active image, keywords extracted from tags of the active image, or areas of interest. In one embodiment, the search mechanism may provide a set of rules (hereinafter called display modifiers) for extracting search terms from tags and areas of interest. For example, where the image (e.g., ALT) tag of the active image contains a subject of the image plus "review," the display modifier may remove the term "review" before placing content of the image tag in the search box.

The augmentation server 110 tracks 560 the received requests and/or the advertisement displays. These activities may be logged in the database 240 or reported to another device or person (e.g., via email).

Example Process and Screen Shots

The methods described above with respect to FIGS. 3-5 are illustrated below in an example together with accompanying FIGS. 6(*a*) through 6(*j*).

Initially, the augmentation server 110 retrieves 310 a web page 600 for augmenting embedded media content. The web page 600 may contain media content of any subject, such as a photo of a new car (e.g., BMW 745i), an image of a landscape oil painting. As shown in FIG. 6(*a*), the web page 600 is retrieved from website people.com and contains information about popular culture singer Vanessa Hudgens.

The augmentation server 110 analyzes 320 the web page 600 for qualified images. As shown in FIG. 6(*a*), there are several images in the web page 600, such as images 610 through 650. The augmentation server 110 determines that images 630 through 650 do not have the required minimum width and/or height and therefore are not qualified images. The augmentation server 110 further determines that image 620 is an advertisement and therefore not qualified. The augmentation server 110 identifies the image 610, a photo of Vanessa Hudgens, as a qualified image.

The augmentation server 110 contextualizes the qualified image 610. The augmentation server 110 examines tags and text associated with the image 610 and determines that the subject of the image 610 is Vanessa Hudgens. For example, the augmentation server 110 may analyze the descriptive content titled "Fan Club" that is to the right of the image 610 to determine that the image is about Vanessa Hudgens.

The augmentation server 110 augments the web page 600 by generating an intelligent tag that uniquely identifies the image 610, and integrating the intelligent tag in the web page 600. For purposes of clarity, the augmented web page is referred to as web page 600' (as illustrated in FIGS. 6(*b*) through 6(*j*)). The augmentation server 110 also includes in the augmented web page 600' JavaScript code that captures user interaction with the image 610.

After the web page 600 is augmented, a web browser running on a client computer 130 can now retrieve the augmented web page 600' and display it to a user (e.g., responding to the user entering "www.people.com" in the address bar of the web browser). FIG. 6(*b*) illustrates a screenshot of the augmented web page 600' as displayed on an Internet Explorer™ web browser after it is retrieved by the browser. It is noted that the augmented web page 600' is displayed in the same manner as the original web page 600 would be displayed in the web browser.

Subsequently, a user may move a pointer (e.g., controlled by a mouse, stylus, or touchpad) over the image 610. This user action is also referred to as a mouse-over. Detecting the mouse-over, the embedded JavaScript code in the augmented web page 700' (or the web browser) generates an intelligent tag request uniquely identifying the image 610, and transmits the request to the augmentation server 110. The augmentation server 110 receives 520 the request and retrieves stored context and subject information (e.g., "Vanessa Hudgens") of the image 610 and searches in an advertising database for related advertisements or rich media content. The augmentation server 110 transmits 540 the related advertisement(s) and/or rich media content(s) back to the web browser for display.

The web browser displays 550 the received advertisement(s) (or rich media content) as an overlay in proximity to the image 610. As illustrated in FIG. 6(*c*), the user has moved a mouse pointer to the right lower corner of the image 610. The web browser receives an interactive banner that reads "Related information to Vanessa Hudgens" and overlays it on the bottom of the image 610 proximate to the pointer. Also displayed on the banner is a tool tip icon (the arrow icon) through which the user can launch a toolbox (or popup box) for additional rich media content.

As illustrated in FIG. 6(*d*), when the user moves the mouse pointer over (or clicks) the tool tip icon, the web browser overlays a toolbox above the banner displaying an interactive advertisement for a movie stared by Vanessa Hudgens— "High School Musical 2." As indicated in the advertisement, the user may interact with the advertisement by a mouse-over the image of the High School Musical 2.

As described above, the augmentation server 110 may transmit 540 other types of rich media content to be overlaid on the image 610. For example, the rich media content may be retail or shopping related rich content. As illustrated in FIG. 6(*e*), the augmentation server 110 may transmits 540 a banner with shopping related information for the web browser to overlay on the image 610. The banner reads "Shop for Entertainment Center" and has a tool tip icon in the shape of a shopping cart. A subsequent mouse-over to the shopping cart (or the banner) generates an overlay for a retail site where an entertainment center may be purchased, as illustrated in FIG. 6(*f*).

Similarly, the augmentation server 110 may augment the image 610 with video (or animation). As illustrated in FIG. 6(*g*), the augmentation server 110 may transmit 540 a banner that reads "Find more videos related to Jason Bourne" for overlay. Thereafter, on a mouse-over user action, the web browser may overlay a video player playing a Jason Bourne's video, as illustrated in FIG. 6(*h*). As shown, the overlaid video player includes video controls such as forward, rewind, play/pause, and/or volume for the user to exercise control over the video being played.

The augmentation server 110 may also integrate functional resources such as web searches in still images, as illustrated in FIGS. 6(*i*) and 6(*j*). In FIG. 6(*i*), the augmentation server 110 transmits 540 a toolbar that reads "Search the web for info related to David Beckham" for overlay. Upon a mouse-over, the web browser launches a search tool overlaying the image 610, as illustrated in FIG. 6(*j*). It is noted that the toolbar and the search tool includes the phrase "David Beckham." In one embodiment, the included phrase is related to the context and/or subject of the image 610.

Alternate Embodiments

In one embodiment, the augmentation server 110 delivers rich media content without augmenting web pages ahead of time. The augmentation server 110 (or other entities) may install a plug-in module in the client web browser. The plug-in module monitors the client's browsing activity and transmits related information (e.g., the URL of the displayed web page) to the augmentation server 110 in real time (or on-the-fly). The augmentation server 110 may retrieve the web page and analyze it for qualified images and related keywords. The augmentation server 110 may transmit the information (e.g., identity of the qualified images or the related keywords) to the client web browser. If the user mouse-over one of the qualified images (the active image), the plug-in module sends a signal to the augmentation server identifying the active image. The augmentation server 110 may determine and transmit a relevant advertisement to the client web browser for display in a manner similar to the one described above with respect to FIG. 5.

In one embodiment, the web pages can be augmented on the client side (e.g., via plug-in modules in the client web browser) in a manner similar to the one described above with respect to FIGS. 3 and 4.

One of ordinary skill in the art will readily recognize that the described system and method are not limited to augmenting still images in web pages with advertisements and can be applied to augment any types of visual elements in any types of documents with any types of rich media content. Examples and detailed descriptions of an approach to augment keywords on web pages with relevant additional information are provided in U.S. Pat. No. 7,257,585, the disclosure of which is incorporated by reference in its entirety.

Advantages of the disclosed embodiments include providing content providers with additional channels for delivering relevant advertisements and other augmented data to viewers. Because the augmented data is displayed as an overlay of the current web page, the disclosed embodiments in essence establish a third dimension to present information (the first and second dimensions being the length and width of the web page), enabling viewers to access additional rich media content without leaving the current web page. This feature is especially useful for devices with limited screen space, such as mobile computing devices (e.g., handheld computers). The disclosed embodiments also enhance viewers' web browsing experience by providing rich media overlays without the need to leave their current web page. In addition, the disclosed embodiments provide additional rich media content on a web page without requiring a media player at a fixed location on the web page.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for augmenting visual elements in documents with rich media content. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for augmenting web pages with rich media content, the method comprising:
   analyzing a web page to identify a qualified visual element;
   determining a keyword associated with the qualified visual element by analyzing tags associated with the qualified visual element, text nodes near the qualified visual element, and areas of interest in the web page;
   generating an association of the visual element and the keyword;
   embedding the association in an augmented web page corresponding to the web page;
   receiving a request from a client computer corresponding to a pointer being positioned over the visual element in the augmented web page; and
   responsive to receiving the signal:
   determining a piece rich media content relevant to the visual element by searching for the advertisement using the keyword, and
   transmitting the piece of rich media content to the client computer for display.

2. The method of claim 1, wherein the visual element comprises one of a still image, a video, or a Flash, and the piece of rich media content comprises an advertisement.

3. The method of claim 1, wherein analyzing the web page to identify the qualified visual element comprises analyzing the web page for visual elements with a length no less than a minimum length, a height no less than a minimum height.

4. The method of claim 1, wherein determining the keyword associated with the qualified visual element comprises:
   identifying context keywords in the web page, and
   identifying subject keywords in the web page.

5. The method of claim 1, wherein embedding the association in the augmented web page corresponding to the web page comprises embedding computer code in the augmented web page for monitoring user pointer movement on a display of the web page.

6. The method of claim 1, wherein the piece of rich media content is displayable as an overlay in an area proximate to the visual element simultaneous to the pointer being positioned over the visual element.

7. The method of claim 1, further comprising:
   tracking the request or the piece of rich media content.

8. A computer readable medium with stored instructions, the instructions when executed by a processor cause the processor to perform a method comprising:
   analyzing a web page to identify a qualified visual element;
   determining a keyword associated with the qualified visual element by analyzing tags associated with the qualified visual element, text nodes near the qualified visual element, and areas of interest in the web page;
   generating an association of the visual element and the keyword;
   embedding the association in an augmented web page corresponding to the web page;
   receiving a request from a client computer corresponding to a pointer being positioned over the visual element in the augmented web page; and responsive to receiving the signal:
  determining a piece rich media content relevant to the visual element by searching for the advertisement using the keyword, and
  transmitting the piece of rich media content to the client computer for display.

9. The computer readable medium of claim 8, wherein the visual element comprises one of a still image, a video, or a Flash, and the piece of rich media content comprises an advertisement.

10. The computer readable medium of claim 8, wherein analyzing the web page to identify the qualified visual element comprises analyzing the web page for visual elements with a length no less than a minimum length, a height no less than a minimum height.

11. The computer readable medium of claim 8, wherein determining the keyword associated with the qualified visual element comprises:
  identifying context keywords in the web page, and
  identifying subject keywords in the web page.

12. The computer readable medium of claim 8, wherein embedding the association in the augmented web page corresponding to the web page comprises embedding computer code in the augmented web page for monitoring user pointer movement on a display of the web page.

13. The computer readable medium of claim 8, wherein the piece of rich media content is displayable as an overlay in an area proximate to the visual element simultaneous to the pointer being positioned over the visual element.

14. The computer readable medium of claim 8, wherein the method further comprises:
  tracking the request or the piece of rich media content.

15. An augmentation system for augmenting web pages with rich media content, the system comprising:
  an input/output module for retrieving web pages, receiving requests, and transmitting augmented web pages and rich media content;
  an image augmentation module for analyzing a web page to identify a qualified visual element, determining a keyword associated with the qualified visual element, generating an association of the visual element and the keyword, and embedding the association in an augmented web page corresponding to the web page;
  an advertisement deliver module for receiving a request from a client computer corresponding to a pointer being positioned over the visual element in the augmented web page, responsive to receiving the signal, determining a piece rich media content relevant to the visual element by searching for the advertisement using the keyword, and transmitting the piece of rich media content to the client computer for display.

16. The augmentation system of claim 15, wherein the visual element comprises one of a still image, a video, or a Flash, and the piece of rich media content comprises an advertisement.

17. The augmentation system of claim 15, wherein the image augmentation module is further configured for analyzing the web page for visual elements with a length no less than a minimum length, a height no less than a minimum height.

18. The augmentation system of claim 15, wherein the image augmentation module is further configured for identifying context keywords in the web page, and identifying subject keywords in the web page.

19. The augmentation system of claim 15, wherein the image augmentation module is further configured for embedding computer code in the augmented web page for monitoring user pointer movement on a display of the web page.

20. The augmentation system of claim 15, wherein the piece of rich media content is displayable as an overlay in an area proximate to the visual element simultaneous to the pointer being positioned over the visual element.

21. The augmentation system of claim 15, wherein the advertisement deliver module is further configured for tracking the request or the piece of rich media content in an augmentation and tracking database, and wherein the augmentation system further comprises the augmentation and tracking database.

\* \* \* \* \*